US00RE40741E

(19) United States
(12) Reissued Patent
Simmonds et al.

(10) Patent Number: US RE40,741 E
(45) Date of Reissued Patent: Jun. 16, 2009

(54) SYSTEM AND METHOD FOR SYNCHRONIZATION OF VIDEO DISPLAY OUTPUTS FROM MULTIPLE PC GRAPHICS SUBSYSTEMS

(75) Inventors: Alan C. Simmonds, Morgan Hill, CA (US); Paul M. Slade, San Jose, CA (US)

(73) Assignee: Quantum 3D, San Jose, CA (US)

(21) Appl. No.: 11/274,718

(22) Filed: Nov. 14, 2005

Related U.S. Patent Documents

Reissue of:
(64) Patent No.: 6,646,645
Issued: Nov. 11, 2003
Appl. No.: 10/133,966
Filed: Apr. 23, 2002

U.S. Applications:
(60) Provisional application No. 60/285,905, filed on Apr. 23, 2001.

(51) Int. Cl.
*G06F 15/16* (2006.01)

(52) U.S. Cl. ..... 345/502; 345/505; 712/16; 712/40; 713/400

(58) Field of Classification Search ..... None
See application file for complete search history.

(56) References Cited

U.S. PATENT DOCUMENTS 5,228,138 A * 7/1993 Pratt et al. ..... 713/401
5,873,119 A * 2/1999 Khandekar et al. ..... 711/169
6,223,265 B1 * 4/2001 Kawasaki et al. ..... 711/167
6,232,955 B1 * 5/2001 Guttag et al. ..... 345/601
2002/0118201 A1 * 8/2002 Mukherjee et al. ..... 345/504

* cited by examiner

*Primary Examiner*—Wesner Sajous
(74) *Attorney, Agent, or Firm*—James E Eakin

(57) ABSTRACT

A system and method for synchronization of video raster display outputs from multiple PC graphics subsystems to facilitate synchronized output onto multiple displays are disclosed. The system and method allow multiple graphics subsystems, in a single or multiple chassis, to be used to provide multiple synchronized view ports of a single 3D database or a wide desktop with reduced inter-monitor artifacts and interference. The system for synchronized video display outputs generally comprises a plurality of graphics subsystems for outputting video display outputs, the plurality of graphics subsystems being housed in at least one chassis, each graphics subsystem comprising a graphics processor, a sync card for each chassis in which at least one graphics subsystem is housed, the sync card is adapted to communicate with a plurality of graphics processors within the same chassis for distribution of reference clock thereto and with a host processor for the corresponding chassis of the sync card for transmission of a raster sync interrupt thereto. The sync card is further adapted to communicate with at least one other sync card by one of receiving reference clock input and raster sync signal from a previous sync card corresponding to a previous chassis and transmitting reference clock input and raster sync signal to a next sync card corresponding to a next chassis.

33 Claims, 8 Drawing Sheets

SYSTEM AND METHOD FOR SYNCHRONIZATION OF VIDEO DISPLAY OUTPUTS FROM MULTIPLE PC GRAPHICS SUBSYSTEMS

Matter enclosed in heavy brackets [ ] appears in the original patent but forms no part of this reissue specification; matter printed in italics indicates the additions made by reissue.

CROSS REFERENCE TO RELATED APPLICATIONS

This application claims priority to U.S. Provisional Patent Application Ser. No. 60/285,905 entitled "System And Method For Raster Synchronization Of Multiple PC Graphics Subsystems" and filed on Apr. 23, 2001, the entirety of which is incorporated herein by reference.

BACKGROUND OF THE INVENTION

1. Field of the Invention

The present invention relates generally to a system and method for synchronization of video display outputs from multiple PC graphics subsystems. More specifically, a system and method for synchronization of video raster display outputs from multiple PC graphics subsystems to facilitate synchronized output onto multiple displays are disclosed.

2. Description of Related Art

Recent advances in commercial off-the-shelf (COTS) graphics technology have brought low cost, high performance two-dimensional (2D) and three-dimensional (3D) graphics subsystems into the personal computer (PC) marketplace. As a result, COTS graphics technology is increasingly used in the professional market to replace very expensive custom hardware. However, such graphics subsystems typically do not have methods for synchronizing raster outputs to allow synchronized output onto multiple displays.

FIG. 1 is a block diagram illustration an exemplary conventional PC graphics subsystem 20 that can be utilized for 2D, windowed 2D, and/or 3D imagery. The PC graphics subsystem 20 typically includes a graphics processor 22 interfacing with a PC motherboard 26 containing a host processor 24 via a host interface 28 such as a personal computer bus, e.g., peripheral component interconnection (PCI) or a video card, e.g., accelerated graphics port (AGP). The graphics processor 22 also interfaces with a reference clock 30, a memory 32, and a video connector 34. The video connector 34 generally includes a red, green and blue (RGB) analog video interface 36, a horizontal and vertical sync (VSYNC, HSYNC) interface 38 where the syncs may be composite or encoded into the green output, and/or a Digital Visual Interface (DVI) 40 for serial bit stream format. DVI is described in, for example, "Digital Visual Interface, Revision 1.0", Digital Display Working Group, Apr. 2, 1999. The video timing typically conforms to the VESA standard. VESA is described in, for example, "VESA Video Signal Standard (VSIS)," Version 1, Rev. 1.0, Video Electronics Standards Association, Nov. 5, 1997. However, it is noted various other suitable standards are often available and may be utilized.

The timing of the video raster is defined by the vertical and horizontal syncs derived from an internal dot clock, i.e., a clock running at pixel rate or a multiple thereof. The internal dot clock is generally derived from a reference oscillator circuit running at a particular frequency, typically 14.318 MHz. It is noted that although any other suitable frequency may be used, the 14.318 MHz frequency is often used on PC graphics subsystems as crystal oscillators as this frequency is readily available.

In a multiple display system, multiple PC graphics subsystems may be housed in one chassis or PC or in multiple chassis or PCs with each chassis or PC housing one or more PC graphics subsystems. Because each graphics processor is running off of its own reference oscillator or clock, if each graphics processor is set up to have the same video format, i.e., horizontal and vertical rates, the raster output from each graphics processor will drift with respect to the raster outputs from the other graphics processors over time. Such drift is caused by the frequency output tolerance of the oscillator producing a dynamic phase drift in the relative graphics processor sync outputs. The phase difference and phase drifting result in a number of adverse side effects such as inter-monitor interference, image tearing in real time rendering, performance degradation in real time rendering and/or problems when overlaying or mixing of outputs. Each of these side effects is described in more detail below.

Inter-monitor interference often results when outputs from multiple PC graphics subsystem are connected to monitors that are in close vicinity to each other such that the monitors' magnetic coils interfere with each other. Inter-monitor interference is generally not noticeable when each monitor is displaying a raster at the same frequency and phase. However, when a phase shift exists between two adjacent monitors, a visible inter-monitor interference will often be present, manifesting itself as a vertically moving pattern. Phase drift causes the vertically moving pattern to scan the image up or down at a frequency equal to the difference between the vertical raster frequency of one monitor and that of the other monitor. The rate of movement can be a number of raster lines per second. The vertically moving pattern often manifests itself as a horizontal shift or image darkening/lightening of a number of lines.

Image tearing in real time rendering is another side effect resulting from the phase difference and phase drifting described above. In particular, when a PC graphics subsystem is used for real time (often 3D) imagery, each new image is rendered into an invisible buffer while the current image remains fixed in the visible buffer. When the rendering of the current image is complete, a buffer swap occurs on the next vertical retrace where the invisible buffer is rendered visible and the visible buffer becomes invisible. The display is thus updated every frame or every integer number of frames. When the outputs from multiple PC graphics subsystems are employed to present a wider field of view of the imagery, the rasters should be aligned to prevent image tearing at the join between the monitors. If the rasters are not aligned, one monitor could be scanning the previous image while an adjacent monitor is scanning the latest. Thus, any rendered moving object that spans the two adjacent monitors may appear disjointed or torn because the moving object appears to be in different positions on the respective displays.

Frame rate performance degradation in real time rendering is yet another side effect resulting from the phase difference and phase drifting described above. In systems with multiple PC graphics subsystems that are buffer swap synchronized but do not have rasters synchronized, frame rate performance can suffer and become erratic. The poor and/or erratic frame rate performance is caused by the dependency of the channels to be synchronized at the point of issuing the buffer swap command and the fact that the buffer swap command is not actually executed until the following video vertical blanking period that occurs at any time between 0 and the video refresh period. During the video refresh period, no rendering occurs as the buffer that is to be rendered is still being used for display output. Thus, the frame rate may suffer by up to one video refresh period.

As an example, a system with a 60 Hz video refresh rate is loaded such that rendering takes less than 1/60 of a second. When the video outputs are in phase, i.e., the rasters are synchronized, the optimum 60 Hz performance is achieved. In contrast, when the video outputs are out of phase, i.e., the rasters are not synchronized, performance will often drop to 30 Hz as the video outputs will tend to move in and out of phase with each other over time. As the animation rate changes from 30 Hz to 60 Hz and back again, jerks and glitches will typically be very noticeable on the video output.

The final side effect noted above resulting from the phase difference and phase drifting is overlaying or mixing of outputs. When outputs from multiple PC graphics subsystems are mixed and the rasters are not synchronized, large FIFOs would be required to pixel-align the imagery prior to the mixing of outputs. In addition, if the buffer swaps are not synchronized, image tearing as described above will also appear.

Moreover, even if phase drifting were not present, i.e. if the PC graphics subsystems were outputting the raster at the same frequency, the phases of each of the PC graphics subsystems would need to be aligned within a line or so to guarantee that all of the above adverse side effects are not apparent to the end user.

Thus, what is needed is a system and method for synchronization of video raster display outputs from multiple PC graphics subsystems to allow synchronized output onto multiple displays. Preferably, such synchronization of video raster display outputs from multiple PC graphics subsystems is achieved by synchronizing the rasters and buffer swaps of multiple PC graphics subsystems. Ideally, such a system and method would obviate the need for or considerably reduce the size of any FIFO implementing the pixel alignment

SUMMARY OF THE INVENTION

A system and method for synchronization of video raster display outputs from multiple PC graphics subsystems to facilitate synchronized output onto multiple displays are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The system for synchronized video display outputs generally comprises a plurality of graphics subsystems for outputting video display outputs, the plurality of graphics subsystems being housed in at least one chassis, each graphics subsystem comprising a graphics processor, a sync card for each chassis in which at least one graphics subsystem is housed, the sync card is adapted to communicate with a plurality of graphics processors within the same chassis for distribution of reference clock thereto and with a host processor for the corresponding chassis of the sync card for transmission of a raster sync interrupt thereto. The sync card is further adapted to communicate with at least one other sync card by one of receiving reference clock input and raster sync signal from a previous sync card corresponding to a previous chassis and transmitting reference clock input and raster sync signal to a next sync card corresponding to a next chassis.

Preferably, the sync card distributes the reference clock to graphics subsystems within the same chassis using transistor—transistor logic (TTL) levels and/or low voltage TTL (LVTTL) levels and receive and/or transmit the reference clock and/or the raster sync using low voltage differential signaling (LVDS) to other sync cards in other chassis.

Where the graphics subsystems are housed in a single chassis, one sync card is preferably provided and communicates with each of the graphics subsystems. Where the graphics subsystems are housed in multiple chassis, each chassis preferably contains a sync card, each sync card is in communication with each graphics subsystem in the corresponding chassis. Generally, with multiple sync cards, one sync card is a master while all other sync cards are slaves. The sync cards may be connected in a daisy-chain, a direct manner in which each slave sync card is directly connected to the master sync card, and any suitable combination.

Each sync card preferably comprises a reference clock oscillator for generating an internal reference clock source, an external reference clock input from a previous sync card corresponding to a previous chassis, if any, and a multiplexer for selecting the internal reference clock source where the sync card is a master and the external reference clock input where the sync card is a slave.

In one preferred embodiment, the sync card further comprises a phase lock loop (PLL) for automatic determination of whether the sync card is a master or slave. The PLL receives as input the external reference clock input and a clock output of the PLL connected via a feedback loop. The multiplexer receives an output of the PLL as in put and selects the internal reference clock source if the PLL fails to lock and the external reference clock input if the PLL locks.

According to another preferred embodiment, each sync card comprises a counter, at least one register, at least one comparator for comparing an output of the counter and a value from the register, and an interrupt logic for receiving an output of the comparator for generating an interrupt signal for transmission to the host processor. The counter and/or comparator may be a field programmable gate array (FPGA) or a complex programmable logic device (CPLD).

The counter may be a scanline counter for counting the number of horizontal syncs (HSYNC) that have passed since the last vertical sync (VSYNC) from the graphics processor. Preferably, two registers store two scanline positions corresponding to before and after a point on the display when a buffer swap is performed by the graphics processor if one has been requested.

Alternatively, the counter can counts clocks based on the reference clock or any other suitable source since the VSYNC was asserted. A comparison of the contents of such a counter with the contents of the two registers can be used to interrupt the host processor.

The method for synchronized video display outputs generally comprises generating an internal reference clock source by a sync card corresponding to each chassis of a multiple graphics subsystems system, each chassis housing at least one graphics subsystem, the graphics subsystems being adapted for outputting video display outputs, each graphics subsystem comprising a graphics processor, receiving at least one of an external reference clock input and a raster sync signal from a previous sync card of a previous chassis, if any, distributing a reference clock signal selected from the internal reference clock source and the external reference clock input to the at least one graphics subsystem housed in the corresponding chassis, transmitting a raster sync interrupt to a host processor for the corresponding chassis, and distributing at least one of the reference clock signal and the raster sync signal to a next sync card corresponding to a next chassis, if any.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A system and method for synchronization of video raster display outputs from multiple PC graphics subsystems to facilitate synchronized output onto multiple displays are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The synchronization of video raster display outputs from multiple PC graphics subsystems for allowing synchronized output onto multiple displays is generally achieved by locking of raster outputs from multiple PC graphics subsystems by distributing a single reference clock to all graphics subsystems and by transmitting a frame initialize signal among the reference clock and the multiple graphics subsystems. Preferably, each raster is within one line of all rasters and pixel jitter and phase drift among the rasters is below one pixel. Rasters from multiple graphics subsystems in one or multiple chassis (or PCs) can be synchronized.

Figure 2:
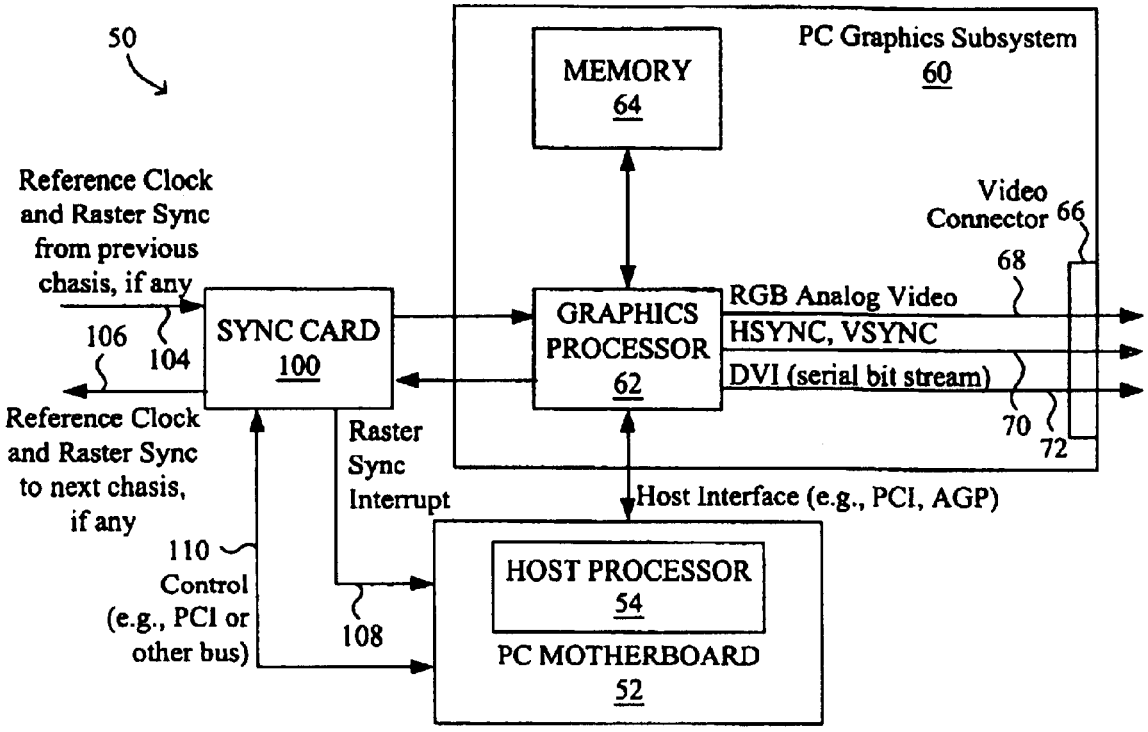
FIG. 2 is a block diagram of a PC with a PC graphics subsystem utilizing a sync card.

FIG. 2 is a block diagram of an exemplary PC 50 with a PC graphics subsystem 60 interfacing with a sync card 100 employed to facilitate synchronization of video raster display outputs from multiple PC graphics subsystems for allowing synchronized output onto multiple displays. The sync card 100 is typically implemented as a circuit installed in the chassis of the PC. Although the sync card 100 is shown as a separate component of the PC graphics subsystem 60, it is to be understood that the sync card 100 may alternatively be integrated into the PC graphics subsystem 60.

Figure 1:
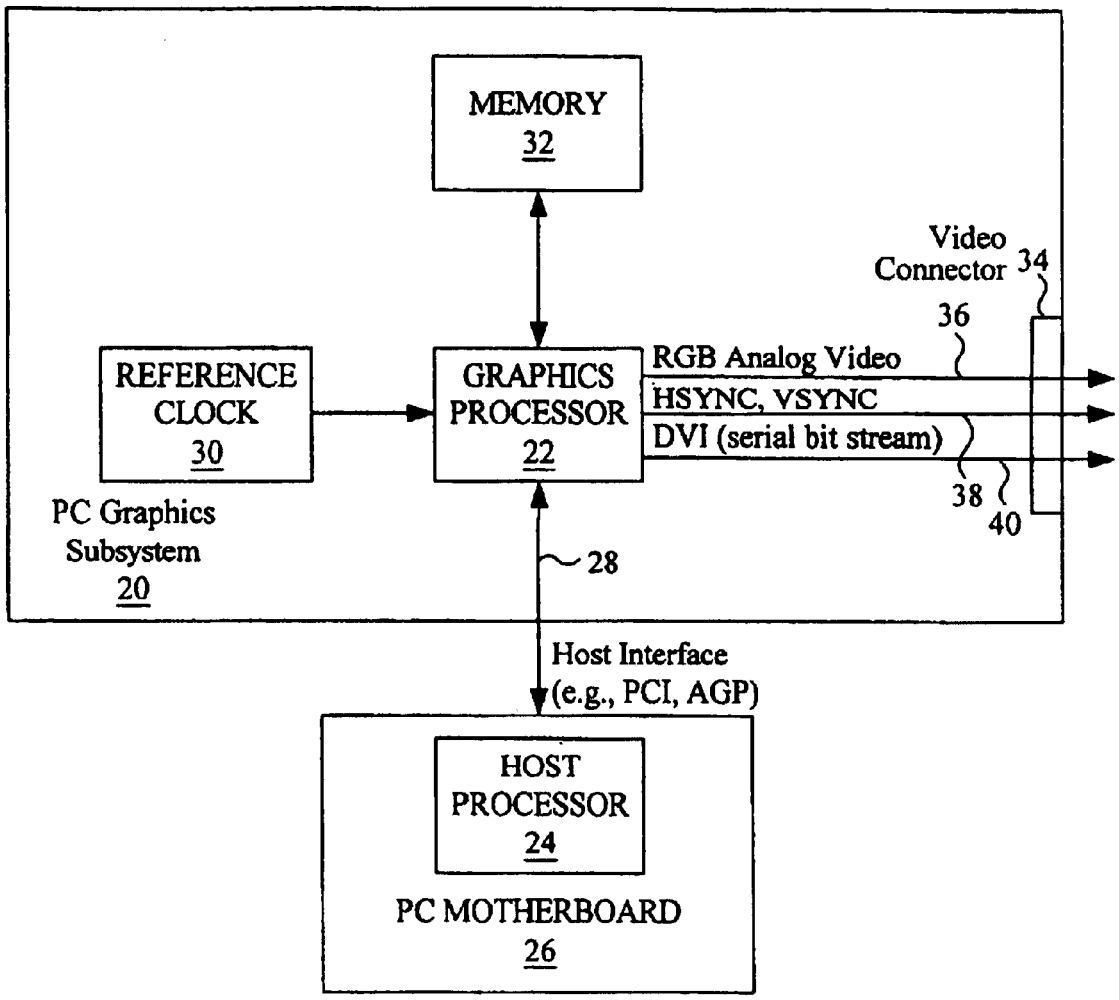
PRIOR ART FIG. 1
FIG. 1 is a block diagram of a conventional PC containing a single COTS or custom PC graphics subsystem.

As with the conventional PC graphics subsystem described above with reference to FIG. 1, the PC graphics subsystem 60 generally includes a graphics processor 62 interfacing a PC motherboard 52 containing a host processor 54 via a host interface 56 such as a personal computer bus, e.g., peripheral component interconnection (PCI) or a video card, e.g., accelerated graphics port (AGP), a memory 32, and a video connector 34. The graphics processor 62 also interfaces with a memory 64 and a video connector 66 that generally includes a red, green and blue (RGB) analog video interface 68, a horizontal and vertical sync (VSYNC, HSYNC) interface 70 where the syncs may be composite or encoded into the green output, and/or a Digital Visual Interface (DVI) 72 for serial bit stream format.

However, rather than interfacing with its own internal reference clock, the graphics processor 62 interfaces with the sync card 100 which in turn interfaces with the PC motherboard 52. In particular, the sync card 100 receives reference clock and raster sync signals from a sync card of a previous chassis, if any, via interface 104 and transmits a reference clock and raster sync signals to a sync card of a subsequent chassis, if any, via interface 106. In addition, the sync card 100 transmits raster sync interrupt signals to the PC motherboard 52 via interface 108 and transmits and/or receives control signals via interface 110. The interfaces 104–110 of the sync card 100 will be described in more detail below.

Figure 3:
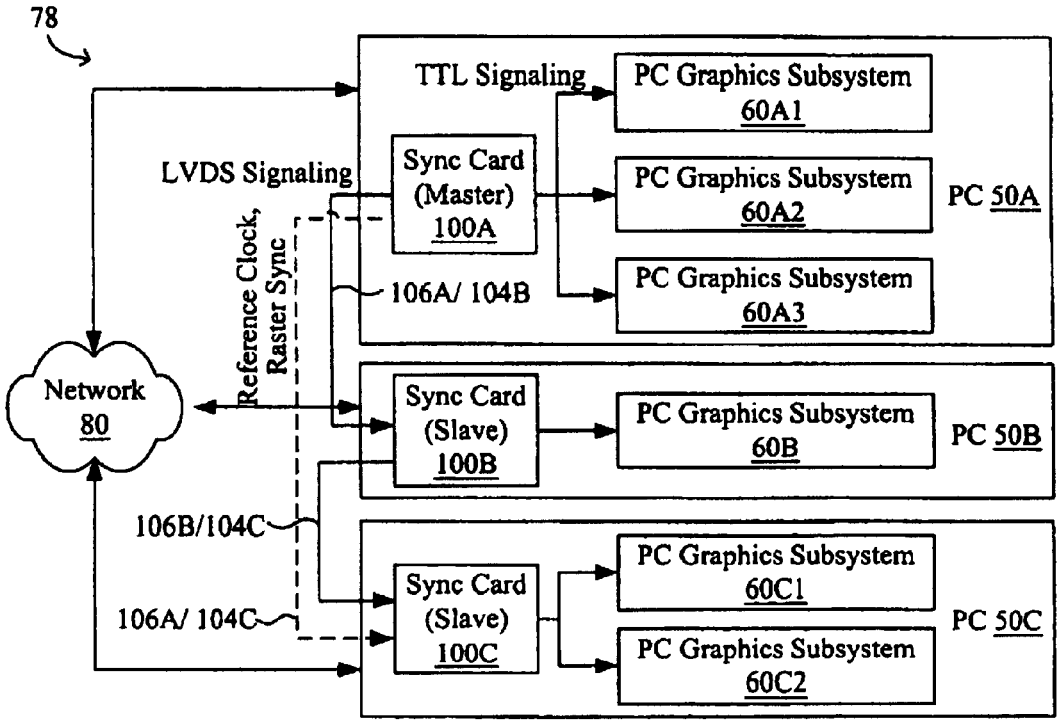
FIG. 3 is a block diagram of multiple PC graphics subsystems in multiple chassis.

FIG. 3 is a block diagram of a multi-chassis system 78 comprising multiple PC graphics subsystems in multiple chassis. In the multi-chassis (i.e., multi-PC) system 78, each chassis includes one or more PC graphics subsystems and communicates with other chassis via a network. For example, as shown, the PCs 50A, 50B, 50C are in communication via a PC communications network 80. Each of the PCs 50A, 50B, 50C includes a sync card in communication with one or more PC graphics subsystems. In particular, PC 50A includes sync card 100A in communication with three PC graphics subsystems 60A1, 60A2, 60A3, PC 50B includes sync card 100B in communication with a single PC graphics subsystem 60B, and PC 50C includes sync card 100C in communication with two PC graphics subsystems 60C1, 60C2. As is evident, one sync card is preferably provided for each chassis or PC and is in communication with sync card(s) corresponding to the other chassis in the system.

The raster clock and the raster sync signals are preferably distributed by each sync card 100 to the PC graphics subsystem(s) 60 within the corresponding chassis using transistor—transistor logic (TTL) levels or low voltage TTL (LVTTL) levels. As is evident, multiple PC graphics subsystems can be supported within one chassis by having multiple TTL outputs from the sync card. In addition, the raster clock and the raster sync signals are preferably distributed among the sync cards in various chassis using low voltage differential signaling (LVDS) for improved noise immunity. Specifically, LVDS provides good noise rejection for chassis to chassis communications. However, any other suitable signaling mechanism for distribution by the sync card within the corresponding chassis and/or the among sync cards in different chassis, preferably a low noise signaling mechanism for distribution among sync cards in different chassis, may be utilized.

In the multi-chassis system 78, one sync card 100A acts as a master sync card for the reference clock while all other sync cards, e.g., sync cards 100B, 100C, serve as slaves and use the reference clock of the master sync card 100A. The reference clock generated by the master sync card 100A is distributed and utilized by all sync cards 100A–C in the multi-chassis system 78.

The multiple sync cards may be daisy-chained with one master feeding the first slave sync card which in turn feeding to the next slave sync cards. In particular, the reference clock and raster sync signals are transmitted from the master sync card 100A to the next slave sync card 100B via interface 106A/104B. The slave sync card 100B in turn transmits the reference clock and raster sync signals to the next slave sync card 100C via interface 106B/104C. Alternatively, if the number of outputs from the master sync card permits, the multiple sync cards can be directly connected to the slave sync cards. It is to be understood that any of suitable combination of connections may be implemented to link multiple sync cards. In the example of FIG. 3, such connection among the master and slave sync cards would be achieved by interfaces 106A/104B and 106A/104C (shown in dash).

Figure 4:
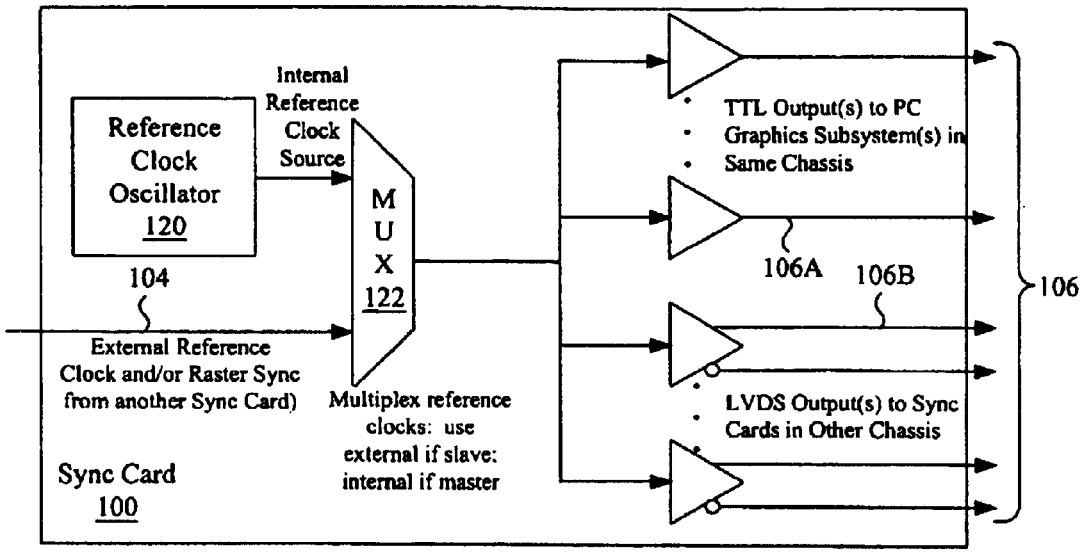
FIG. 4 is a block diagram of the sync card illustrating distribution of the reference clock signals in more detail.

FIG. 4 is a block diagram of an exemplary sync card 100 illustrating distribution of the reference clock signals in more detail. As shown, the sync card 100 includes a reference clock generator 102, e.g., a crystal oscillator running at the reference frequency, an external reference clock input 104, a multiplexer 122, and one or more reference clock outputs 106. Preferably, the reference clock oscillator 102 is selected to have the same reference frequency as that used on each of the PC graphics subsystems, typically 14.318 MHz although any other suitable frequency may be utilized. The output of the reference clock oscillator 102 serves as an internal reference clock signal source. The multiplexer 122 selects either the internal reference clock generated by the internal reference clock oscillator 120 or the external reference clock input 104. In particular, where the sync card is a master sync card, the multiplexer 122 outputs the reference clock generated by the internal reference clock oscillator 120 and ignores the external reference clock input 104. Alternatively, where the sync card is a slave sync card, the multiplexer 122 outputs the external reference clock input 104 and ignores the reference clock generated by the internal reference clock oscillator 120. In other words, each slave sync card ignores the output from its own reference clock oscillator and, instead, uses the reference clock input as the reference clock source as provided by the master sync card.

Both the master and slave sync cards distributes the reference clock output by the multiplexer 122 to outputs 106. As noted above, the one or more reference clock outputs 106 preferably includes at least one TTL output 106A that outputs to PC graphics subsystem(s) in the same chassis as the sync card 10 and at least one LVDS output 106B that outputs to sync cards in other chassis.

To implement the PC graphics subsystem with the sync card as described herein, a COTS PC graphics subsystem may be utilized by making minor modifications to remove the reference oscillator, often a surface mount component, and adding the sync card, such as by wiring and soldering the sync card directly to the PC graphics subsystem or by inserting a plug/socket into the PC graphics subsystem and terminating the clock wire from the sync card in a mated plug/socket.

According to a preferred embodiment, a ground is preferably connected between the sync card and the PC graphics subsystem to provide a high-speed signal return path for the reference clock output of the sync card. Preferably, the sync card clock output and its ground are twisted along their lengths and a series resistor is added to the clock output at its source, the value of which is chosen to match the impedance of the twisted clock/ground signal pair in order to improve the signal integrity of the clock output of the sync card. The reference clock output from the sync card is connected to one of two pads on the PC graphics subsystem from which the original PC graphics subsystem oscillator was removed, the particular pad can be determined by one of ordinary skill in the art by, for example, referring to the design documentation of the PC graphics subsystem. The ground from the sync card is preferably connected to a digital ground point on the PC graphics subsystem as close as possible to the clock. Often this is the other oscillator pad.

Alternatively, a proprietary PC graphics subsystems may be provided such that the reference clock connectivity can be designed in, added as a mezzanine card, and/or incorporated as wire modifications.

Figure 5:
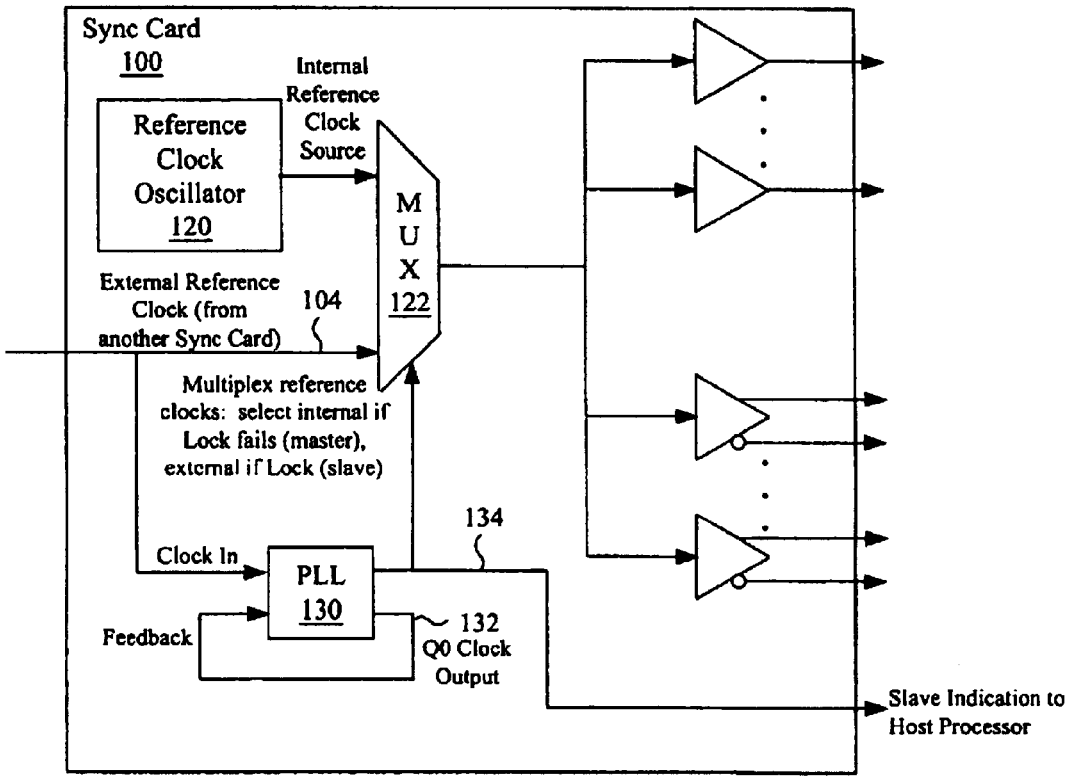
FIG. 5 is a block diagram of the sync card with automatic master/slave detect.

FIG. 5 is a block diagram of the sync card 100 employing an automatic master/slave detection mechanism such that the sync card 100 can automatically determine if it is a master or a slave using a LOCK output 134 of a phase lock loop (PLL) 130. In particular, the PLL 130 receives as input the external reference clock 104 as well as one of the clock outputs 132, e.g., Q0 clock output, connected via a feedback loop. The multiplexer 122 then, based on the LOCK output of the PLL 134, selects either the reference clock generated by the internal reference clock oscillator 120 where the sync card 100 is a master, i.e., where the LOCK fails, or the external reference clock input 104 where the sync card 100 is a slave, i.e., where the LOCK succeeds. Thus, a multi-chassis system employing sync cards such an automatic master/slave detection mechanism is self-configuring, dependent only upon cable connections. It is noted that, although the use of a PLL is preferred, any other master/slave detection mechanism may be implemented. For example, a switch may be alternatively used or a single master and one or more slave sync cards may be expressly incorporated into the circuit design.

Raster Sync Signal Generation and Distribution

Because each PC graphics subsystem generates internal pixel clocks derived from the reference clock provided by the sync card, each raster will be locked in a fixed but out of phase relationship with respect to other graphics subsystems. The actual phase difference is generally indeterminate. To align the phase of each subsystem requires the resetting of the horizontal (pixel) and vertical (line) raster counters internal to the graphics processor of each PC graphics subsystem. Ideally, the raster reset occurs simultaneously or within a few pixels on each graphics subsystem. However, for the purposes of reducing the drifting and phase difference side effects as described above, each graphics subsystem can be within a line or two of the other graphics subsystems while still sufficiently eliminating these adverse side effects.

For a single chassis system, aligning the raster phase of the PC graphics subsystems can be achieved by simultaneously or sequentially clearing their raster counters at any time during initialization. For a multiple chassis system where each chassis contains one or more graphics subsystems, aligning the raster phase should be done simultaneously by all graphics subsystems. To ensure synchronous operation, a raster sync signal is distributed to host processors associated with all the sync cards at initialization. The raster sync signal can be distributed by the sync cards in a similar manner as for the reference clock. However, the host processor of the PC rather than the graphics processors is the receiver of the raster sync signal. In particular, the master sync card generates the raster sync signal that is passed to the host processor of the corresponding PC as well as to all slave sync cards in the system that in turn passes the raster sync signal to all host processors of the corresponding PCs. The raster sync signal can be used as an interrupt to the host processor which would then reset the raster counters on the corresponding graphics processors.

The raster sync signal can be passed between chassis as either a single TTL or LVDS signal or can be encoded on a serial bit stream with other information. Examples of such other information include initialization information such as a board identification number and network address of the PC containing the master sync card.

Generation of the raster sync signal by the master sync card is generally under control of the corresponding host processor via a PCI or other system bus I/O controller on the sync card (shown in FIG. 2). On receipt of the raster sync signal at the slave sync card, a host processor interrupt would be generated by the I/O controller on the slave sync card, resulting in the execution of an interrupt service routine by the host processor. Execution of the interrupt service routine resets the raster counters on the corresponding graphics processors.

To minimize skew between the reset of the raster counters on the master and those on the slave graphics subsystem processors, the master sync card can directly generate the host processor interrupt and distribute the host processor interrupt to the slave sync cards. However, it is noted that the host processor interrupt should be generated by the master sync card as the raster reset signal is sent rather than as the raster reset signal is received. This is achieved by, for example, multiplexing the raster sync signal entering the interrupt logic of the I/O controller.

It is noted that an off-the-shelf PCI I/O or any other suitable system bus, controller chip, or IP core can be used to read the master/slave state, issue the raster sync signal, and/or generate the interrupt.

Avoiding Buffer Swap Race Hazard

The sync card generates two additional interrupts in order to avoid race hazards created when buffer swap is synchronized over multiple PC graphics subsystems. The two interrupts interrupt the host processor when the graphics processor is at a corresponding specific scanline (or a corresponding clock count from vertical sync) before and after the point on the display when the hardware physically performs a buffer swap (if one has been requested). These two points or positions define a time period within each raster frame where there is insufficient time to control a synchronized buffer swap without a race hazard occurring.

Figure 6:
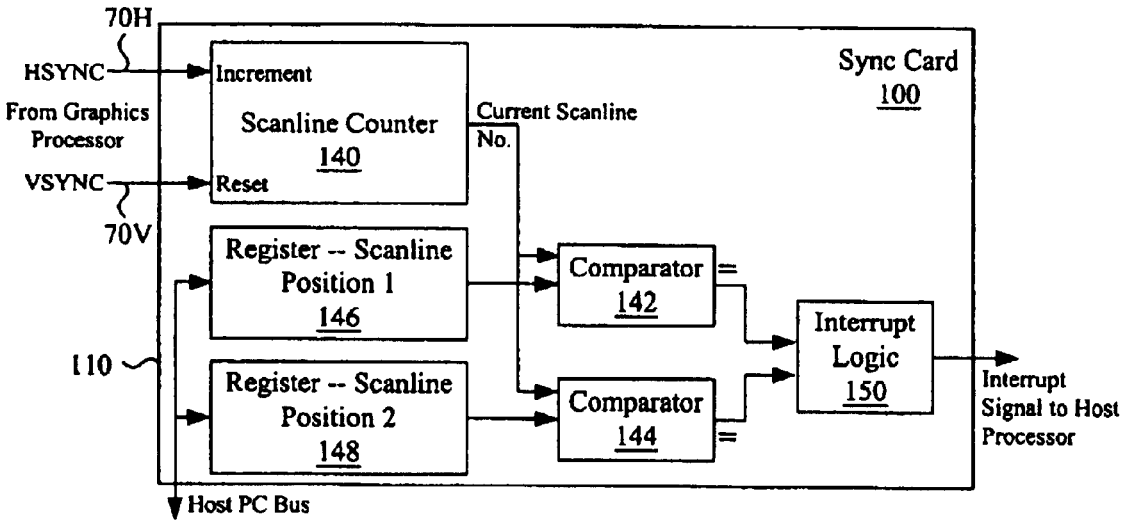
FIG. 6 is a block diagram of the sync card with an interrupt scheme utilizing scanline counters for avoiding a buffer swap race hazard.

FIG. 6 is a block diagram of the sync card 100 with an interrupt scheme utilizing a scanline counter 140 for avoiding a buffer swap race hazard where both the raster horizontal and vertical syncs (HSYNC and VSYNC) 70H, 70V, respectively, of the graphics processor are available. The scanline counter 140 counts the number of horizontal syncs (HSYNC) that have passed since the last vertical sync (VSYNC) from the graphics processor.

In particular, the HSYNC and the VSYNC 70H, 70V are connected to the sync card 100 such as by intercepting the HSYNC and the VSYNC on the paths from the graphics processor to the video connector (not shown). When the sync card 100 feeds multiple PC graphics subsystems, the corresponding multiple graphics processors are generally synchronized to be outputting the same scanline and nearly the same pixel such that signals form only one of the graphics processor is used.

Any suitable logic device such as a field programmable gate array (FPGA) or a complex programmable logic device (CPLD) may be used to implement the counter 140 and comparators 142, 144 that facilitate in detecting the two points or positions within the raster frame for generating the respective interrupts. Each interrupt, generated by interrupt logic 150, is transmitted to the host processor of the PC via an I/O controller which may be embedded within the FPGA. The selected scanline locations are preferably programmed into registers 146, 148 over the PCI or other bus 110 between the host processor and the sync card 100.

Figure 7:
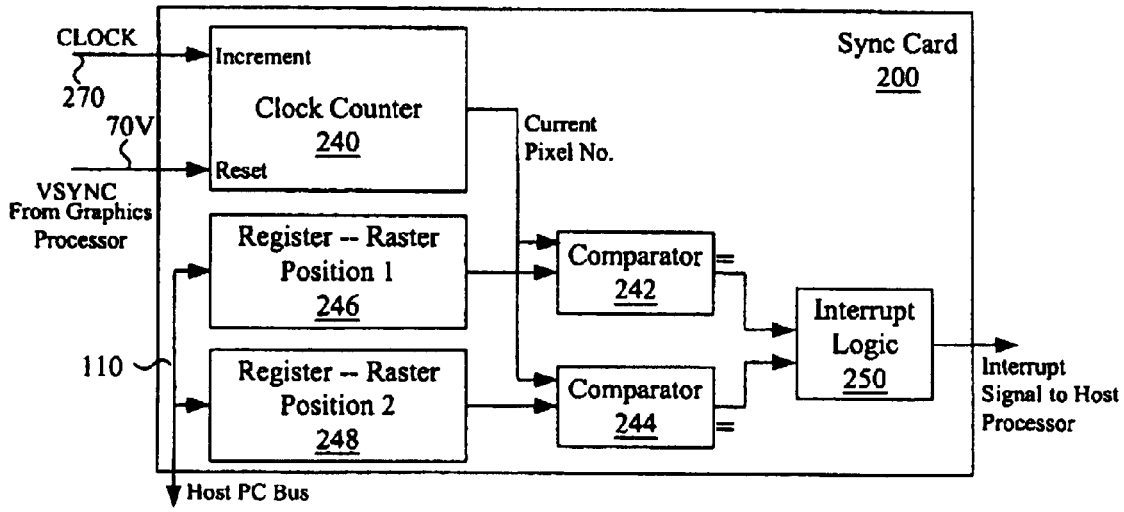
FIG. 7 is a block diagram of the sync card with an alternative interrupt scheme utilizing clock counters for avoiding the buffer swap race hazard.

FIG. 7 is a block diagram of a sync card 200 with an alternative interrupt scheme utilizing a clock counter 240 for avoiding the buffer swap race hazard where only the VSYNC 70V is available.

In particular, a count of the number of clocks 270 based on, for example, the reference clock, a dot clock, or any other suitable clock source, since the VSYNC 70V was asserted may be utilized. Typically, in contrast to the interrupt scheme shown and described with reference to FIG. 6, the size of the comparison registers 246, 248 and counter 240 need to be larger and the values loaded into the registers 246, 248 are in units of clocks rather than scanlines.

As noted above, any suitable logic device such as a FPGA or a CPLD may be used to implement the counter 240 and comparators 242, 244 that facilitate in detecting the two points or positions within the raster frame for generating the respective interrupts. Each interrupt, generated by interrupt logic 250, is transmitted to the host processor of the PC via an I/O controller which may be embedded within the FPGA. The selected raster positions in the frame are preferably programmed into registers 246, 248 over the PCI or other bus 110 between the host processor and the sync card 200.

With either interrupt scheme, buffer swap synchronization occurs as follows. When each graphics subsystem has finished rendering a frame, the graphics subsystem communicates a ready to buffer swap message to a single central swap controller, such as the PC associated with the master sync card. The ready to buffer swap message can be sent via a serial interface such a network. Each graphics subsystem is then prevented from performing a buffer swap until all other graphics subsystems are ready to perform a buffer swap. This is achieved by waiting for a perform buffer swap message to be broadcasted from the master swap controller to all graphics subsystems. The master swap controller broadcasts the perform swap message once it has received a ready to swap message from all graphics subsystems and the video raster is not currently between the two specified interrupt positions.

In the case that the current raster is between the two specified interrupt positions, the master swap controller waits until the second interrupt has occurred before sending the perform swap message. A race hazard would otherwise result if some PC graphics subsystems receive the buffer swap message before while others receive the buffer swap message after the point on the display when the hardware physically performs a buffer swap if one has been requested such that not all graphics subsystems would display the same frame. The interrupt mechanisms thus prevents any perform swap messages from being sent during the period where a race hazard could occur.

Figure 8:
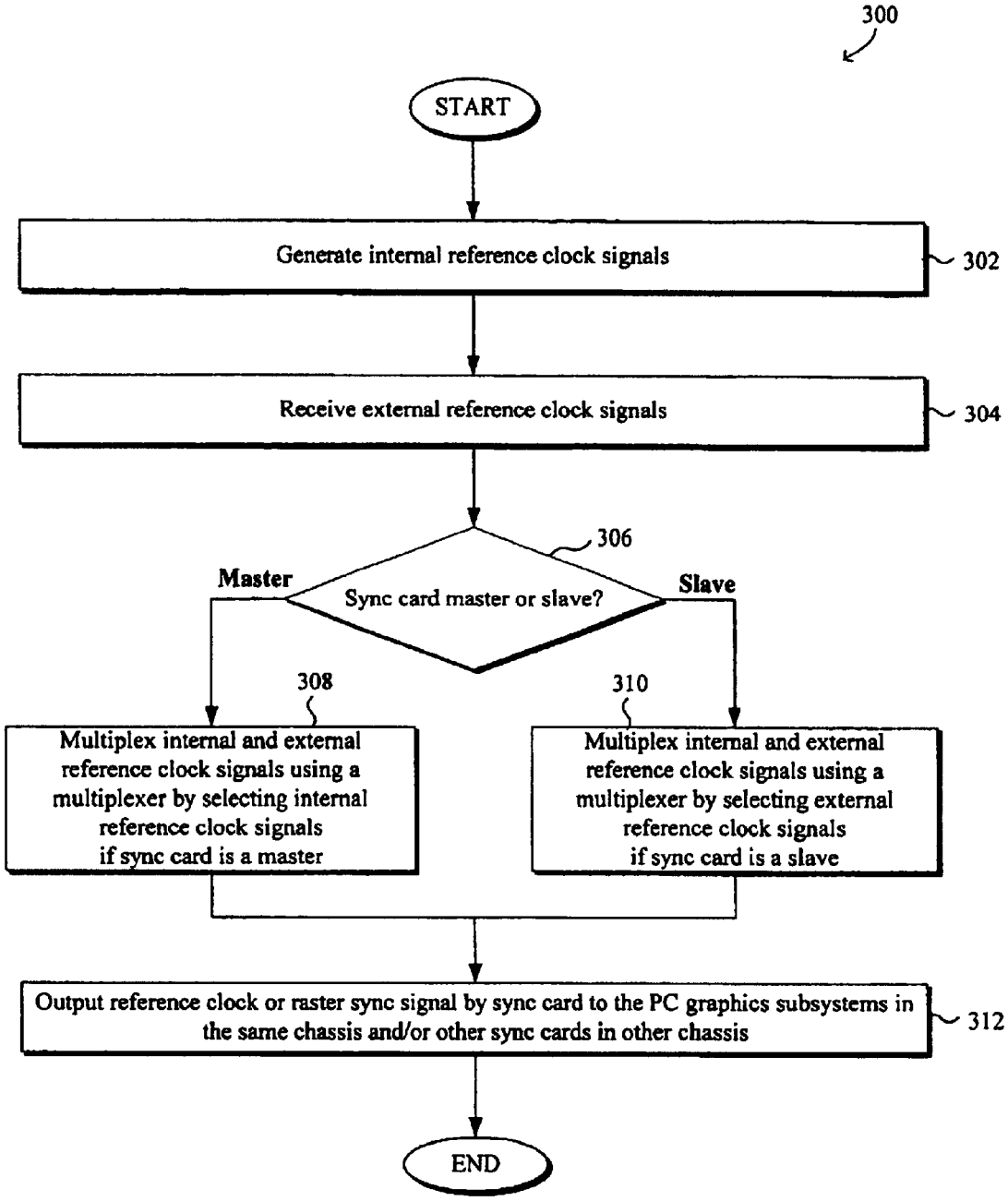
FIG. 8 is a flow chart illustrating a method for synchronizing video raster display outputs from multiple PC graphics subsystems for synchronized output onto multiple displays using the sync card.

FIG. 8 is a flow chart illustrating a method 300 for synchronizing video raster display outputs from multiple PC graphics subsystems for synchronized output onto multiple displays. At step 302, internal reference clock signals, if any, are generated such as by a reference clock oscillator. (e.g., no if slave sync card designed not to have a reference clock oscillator) At step 304, external reference clock signals, if any, are received such as from another sync card. It is noted that, as an example, where a sync card is specifically designed or implemented as a master sync card, the master sync card may not have an input or may not have any connection to its external reference clock input. Similarly, where a sync card is specifically designed or implemented as a slave sync card, the slave sync card may not include an internal reference clock oscillator.

Next, at step 306, the sync card is determined to be a master or a slave sync card. For example, a PLL may be utilized that receives as input the external reference clock signal and one of the clock outputs of the PLL via a feedback loop. The sync card is a slave or a master if the PLL locks or if the the lock fails, respectively. If the sync card is a master, then at step 308, the internal and external reference clock signals are multiplexed using a multiplexer and the internal reference clock signals are selected. Alternatively, if the sync card is a slave, then at step 310, the internal and external reference clock signals are multiplexed using a multiplexer and the external reference clock signals are selected. At step 312, the sync card outputs the reference clock or raster sync signal to the PC graphics subsystems in the same chassis and/or other sync cards in other chassis.

Figure 9:
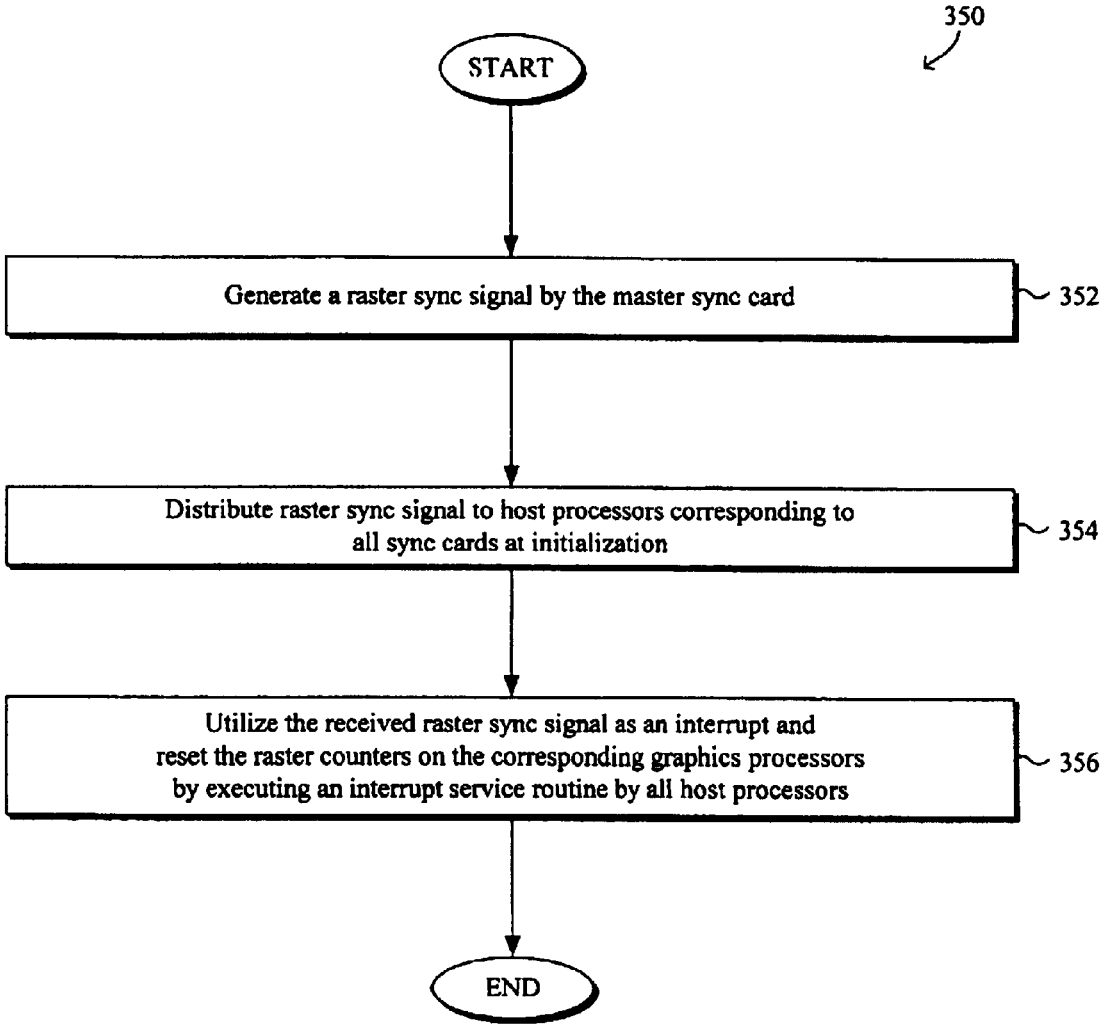
FIG. 9 is a flow chart illustrating a method for aligning the raster phase of the multiple PC graphics subsystems in multiple chassis using a sync card associated with each chassis or PC each containing one or more PC graphics subsystems.

FIG. 9 is a flow chart illustrating a method 350 for aligning the raster phase of the multiple PC graphics subsystems in multiple chassis using a sync card associated with each chassis or PC each containing one or more PC graphics subsystems. Alignment of the raster phase of multiple PC graphics subsystems requires the resetting of the horizontal (pixel) and vertical (line) raster counters internal to the graphics processor of each PC graphics subsystem. For a single chassis system, raster phase alignment can be achieved by simultaneously or sequentially clearing the raster counters of the multiple graphics subsystems at any time during initialization. For a multiple chassis system, raster phase alignment should be done simultaneously by all graphics subsystems.

The method 350 for aligning the raster phase for a multiple chassis system begins by generating a raster sync signal by the master sync card at step 352. Generally, the master sync card is under control of the host processor corresponding to the master sync card for the raster sync signal generation step 352. At step 354, the raster sync signal is distributed to host processors corresponding to all sync cards at initialization. At step 356, each host processor utilizes the received raster sync signal as an interrupt and resets the raster counters on the corresponding graphics processors by executing an interrupt service routine. It is noted that method 350 is but one way of aligning the raster phase for a multiple chassis system. For example, in order to minimize skew between the reset of the raster counters on the master and those on the slave graphics subsystem processors, the master sync card may alternatively directly generate a host processor interrupt and distribute the host processor interrupt to all host processors in the multi-chassis system. Any other suitable methods for aligning the raster phase for a multiple chassis system may be implemented.

Figure 10:
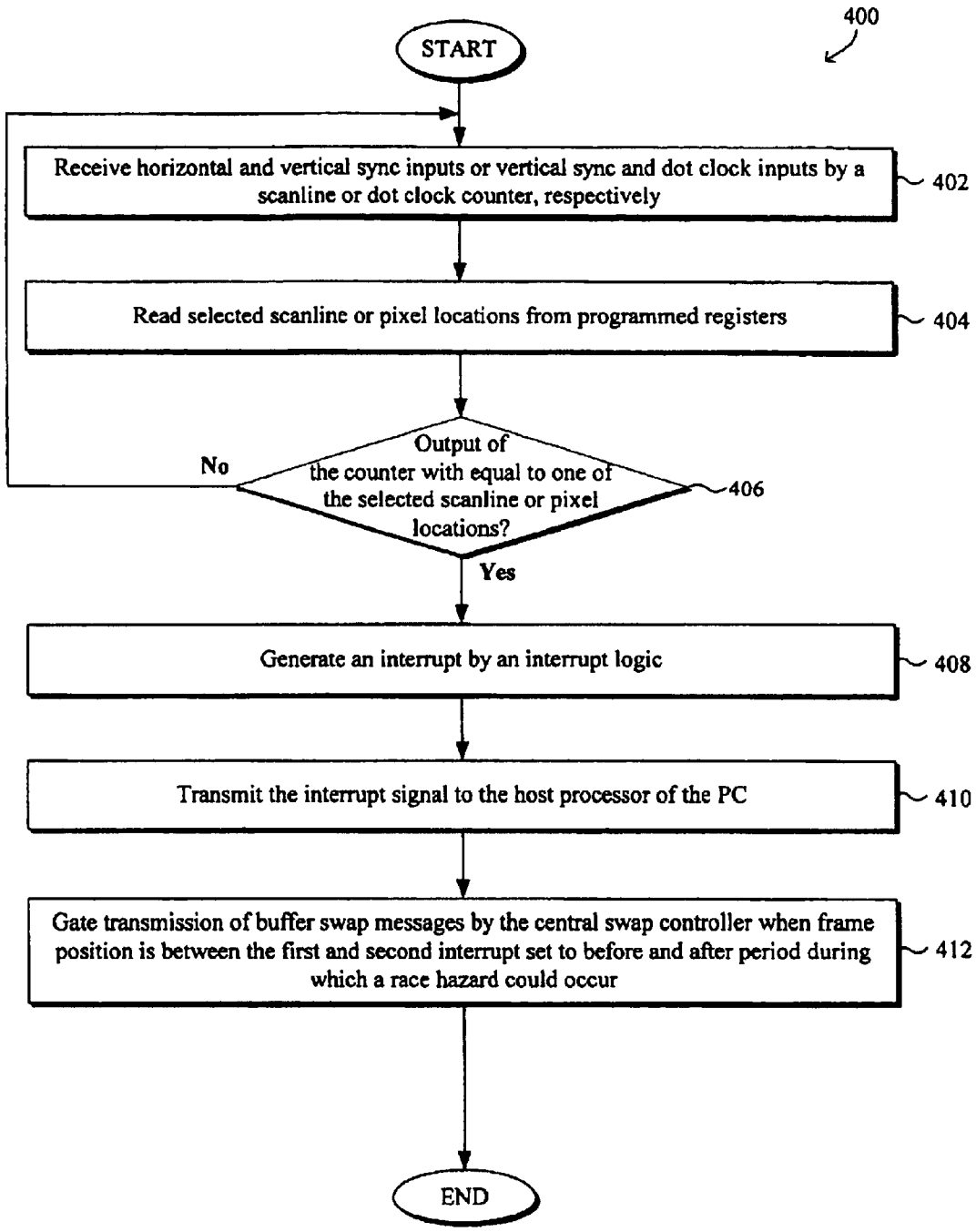
FIG. 10 is a flow chart illustrating a method for avoiding buffer swap race hazard using a sync card associated with each chassis or PC.

FIG. 10 is a flow chart illustrating a method 400 for avoiding buffer swap race hazard using a sync card associated with each chassis or PC. In particular, using the method 400, the sync card generates two interrupts to interrupt the host processor when the graphics processor is each of two specific scanline (or a corresponding clock count from the vertical sync) before and after the point on the display when the hardware physically performs a buffer swap where one has been requested. These two specific points define a time period within each raster frame where there is insufficient time to control a synchronized buffer swap without a race hazard occurring.

At step 402, horizontal and vertical sync inputs or vertical sync and dot clock inputs are received by a scanline or clock counter, respectively. At step 404, selected scanline or positions in the frame are read from programmed registers, the selected locations defining a time period within each raster frame where there is insufficient time to control a synchronized buffer swap without a race hazard occurring. At step 406, the output of the counter is compared with each selected scanline or raster location read from the register in step 404 in order to detect each point within the raster frame for generating an interrupt. If the result of the comparison step 406 is not equal, then the method 400 returns to step 402. Alternatively, if the result of the comparison step 406 is equal, then an interrupt is generated by an interrupt logic at step 408. At step 410, the interrupt signal is transmitted to the host processor of the PC.

At step 412, the central swap controller gates the transmission of buffer swap messages when the frame position is between the first and second interrupt. The first and second interrupt are set to before and after the period during which a race hazard could occur. Thus, the first interrupt functions to close the gate while the second interrupt functions to open the gate.

Thus, the graphics subsystems are prevented from performing a buffer swap until all other PC graphics subsystems are required to do so on the next frame. A race hazard may otherwise result if some PC graphics subsystems receive the buffer swap message before while others received the buffer swap message after the point on the display when the hardware physically performs a buffer swap if one has been requested as not all PC graphics subsystems would then be displaying the same frame. The interrupt method 400 thus achieves buffer swap synchronization by preventing any buffer swap messages from being sent during the period where a race hazard could occur.

Figure 11:
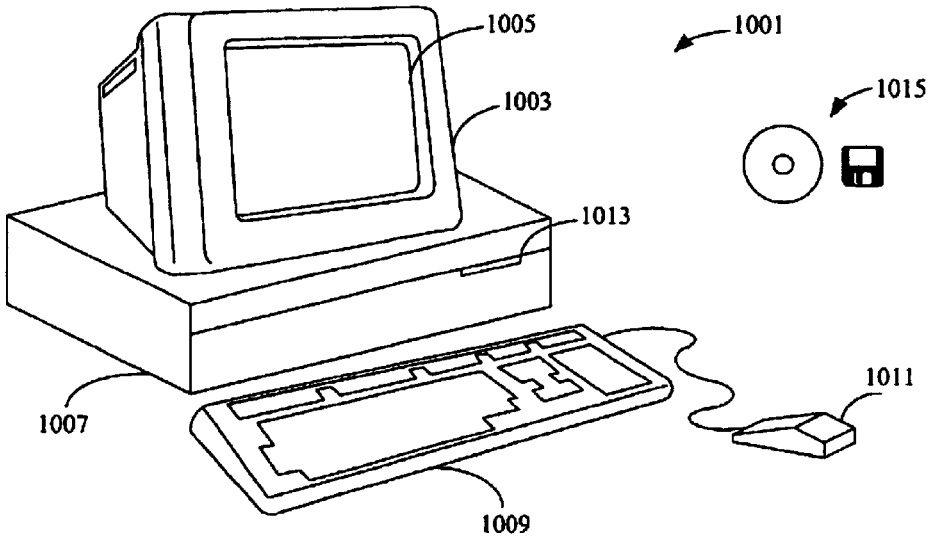
FIG. 11 illustrates an example of a computer system that can be utilized with the various embodiments of method and processing described herein.
Figure 12:
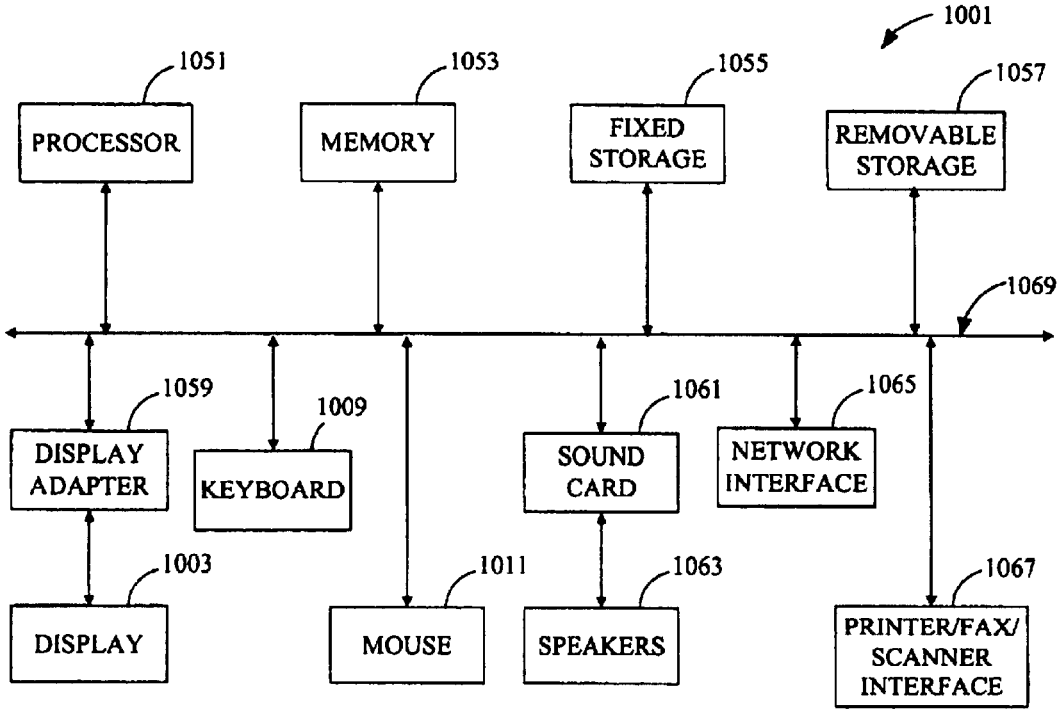
FIG. 12 illustrates a system block diagram of the computer system of FIG. 11.

FIGS. 11 and 12 illustrate a schematic and a block diagram, respectively, of an exemplary general purpose computer system 1001 suitable for executing software programs that implement the methods and processes described herein. The architecture and configuration of the computer system 1001 shown and described herein are merely illustrative and other computer system architectures and configurations may also be utilized.

The exemplary computer system 100 includes a display 1003, a screen 1005, a cabinet 1007, a keyboard 1009, and a mouse 1011. The cabinet 1007 typically houses one or more drives to read a computer readable storage medium 1015, a system memory 1053, and a hard drive 1055 which can be utilized to store and/or retrieve software programs incorporating computer codes that implement the methods and processes described herein and/or data for use with the software programs, for example. A CD and a floppy disk 1015 are shown as exemplary computer readable storage media readable by a corresponding floppy disk or CD-ROM or CD-RW drive 1013. Computer readable medium typically refers to any data storage device that can store data readable by a computer system. Examples of computer readable storage media include magnetic media such as hard disks, floppy disks, and magnetic tape, optical media such as CD-ROM disks, magneto-optical media such as floptical disks, and specially configured hardware devices such as application-specific integrated circuits (ASICs), programmable logic devices (PLDs), and ROM and RAM devices.

Further, computer readable storage medium may also encompass data signals embodied in a carrier wave such as the data signals embodied in a carrier wave carried in a network. Such a network may be an intranet within a corporate or other environment, the Internet, or any network of a plurality of coupled computers such that the computer readable code may be stored and executed in a distributed fashion.

The computer system 1001 comprises various subsystems such as a microprocessor 1051 (also referred to as a CPU or central processing unit), system memory 1053, fixed storage 1055 (such as a hard drive), removable storage 1057 (such as a CD-ROM drive), display adapter 1059, sound card 1061, transducers 1063 (such as speakers and microphones), network interface 1065, and/or printer/fax/scanner interface 1067. The computer system 1001 also includes a system bus 1069. However, the specific buses shown are merely illustrative of any interconnection scheme serving to link the various subsystems. For example, a local bus can be utilized to connect the central processor to the system memory and display adapter.

Methods and processes described herein may be executed solely upon CPU 1051 and/or may be performed across a network such as the Internet, intranet networks, or LANs (local area networks) in conjunction with a remote CPU that shares a portion of the processing.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A system for synchronized video display outputs, comprising:

a plurality of graphics subsystems for outputting video display outputs, said plurality of graphics subsystems being housed in at least one chassis, each graphics subsystem comprising a graphics processor;

a sync card for each chassis in which at least one graphics subsystem is housed, said sync card is adapted to communicate with a plurality of graphics processors within the same chassis for distribution of reference clock thereto and with a host processor for the corresponding chassis of the sync card for transmission of a raster sync interrupt thereto, said sync card is further adapted to communicate with at least one other sync card by one of:

receiving reference clock input and raster sync signal from a previous sync card corresponding to a previous chassis, and transmitting reference clock input and raster sync signal to a next sync card corresponding to a next chassis.

2. The system for synchronized video display outputs of claim 1, wherein said sync card distributes the reference clock to at least one graphics subsystem within the same chassis using at least one of transistor—transistor logic (TTL) levels and low voltage TTL (LVTTL) levels.

3. The system for synchronized video display outputs of claim 1, wherein said sync card is adapted to at least one of receive and transmit reference clock input and raster sync signal using low voltage differential signaling (LVDS) from and to a sync card corresponding to a previous and a next chassis, respectively.

4. The system for synchronized video display outputs of claim 1, wherein said plurality of graphics subsystems are housed in a single chassis containing one sync card, the sync card being in communication with each of the graphics subsystems for distribution of reference clock thereto.

5. The system for synchronized video display outputs of claim 1, wherein said plurality of graphics subsystems are housed in multiple chassis each containing one sync card, each sync card being in communication with each of the graphics subsystems in the corresponding chassis, one of the multiple sync cards being a master sync card and remainder of the multiple sync cards being slave sync cards.

6. The system for synchronized video display outputs of claim 5, wherein the plurality of sync cards are connected in at least one of a daisy-chain manner, a direct manner in which each slave sync card is directly connected to the master sync card, and a combination of the daisy-chain manner and direct manner.

7. The system for synchronized video display outputs of claim 5, wherein each sync card comprises a reference clock oscillator for generating an internal reference clock source, an external reference clock input from a previous sync card corresponding to a previous chassis, if any, and a multiplexer for selecting the internal reference clock source where the sync card is a master and the external reference clock input where the sync card is a slave.

8. The system for synchronized video display outputs of claim 1, wherein each sync card comprises a reference clock oscillator for generating an internal reference clock source, an external reference clock input from a previous sync card corresponding to a previous chassis, if any, and a multiplexer for selecting one of the internal reference clock source and the external reference clock input.

9. The system for synchronized video display outputs of claim 8, wherein the sync card further comprises a phase lock loop (PLL) for automatic determination of whether the sync card is a master or slave, said PLL receives as input the external reference clock input and a clock output of the PLL connected via a feedback loop.

10. The system for synchronized video display outputs of claim 9, wherein the multiplexer of the sync card selects the internal reference clock source if the PLL fails to lock and the external reference clock input if the PLL locks.

11. The system for synchronized video display outputs of claim 1, wherein each sync card comprises a counter, at least one register, at least one comparator for comparing an output of the counter and a value from the register, and an interrupt logic for receiving an output of the comparator for generating an interrupt signal for transmission to the host processor.

12. The system for synchronized video display outputs of claim 11, wherein at least one of the counter and comparator is selected from a field programmable gate array (FPGA) and a complex programmable logic device (CPLD).

13. The system for synchronized video display outputs of claim 11, wherein said at least one register comprises two registers storing two positions corresponding to before and after a point on the display when a buffer swap is performed by the graphics processor if one has been requested.

14. The system for synchronized video display outputs of claim 13, wherein said interrupt logic generates the interrupt signal when contents of the counter is equal to one of the values stored in said registers.

15. The system for synchronized video display outputs of claim 11, wherein said counter is a scanline counter for counting the number of horizontal syncs (HSYNC) that have passed since the last vertical sync (VSYNC) from the graphics processor and said at least one register comprises two registers storing two scanline positions.

16. The system for synchronized video display outputs of claim 11, wherein said counter is a clock counter that counts clocks since a vertical sync (VSYNC) was asserted by the graphics processor and said at least one register comprises two registers storing two raster positions.

17. A method for synchronized video display outputs, comprising the steps of:

generating an internal reference clock source by a sync card corresponding to each chassis of a multiple graphics subsystems system, each chassis housing at least one graphics subsystem, the graphics subsystems being adapted for outputting video display outputs, each graphics subsystem comprising a graphics processor;

receiving at least one of an external reference clock input and a raster sync signal from a previous sync card of a previous chassis, if any;

distributing a reference clock signal selected from the internal reference clock source and the external reference clock input to the at least one graphics subsystem housed in the corresponding chassis;

transmitting a raster sync interrupt to a host processor for the corresponding chassis; and distributing at least one of the reference clock signal and the raster sync signal to a next sync card corresponding to a next chassis, if any.

18. The method for synchronized video display outputs of claim 17, wherein said distributing the reference clock signal to the at least one graphics subsystem housed in the corresponding chassis comprises using at least one of transistor—transistor logic (TTL) levels and low voltage TTL (LVTTL) levels.

19. The method for synchronized video display outputs of claim 17, wherein at least of one said receiving from the previous sync card of the previous chassis, if any, and distributing to the next sync card corresponding to the next chassis, if any, comprises using low voltage differential signaling (LVDS) from and to a sync card corresponding to a previous and a next chassis, respectively.

20. The method for synchronized video display outputs of claim 17, wherein the plurality of graphics subsystems are housed in a single chassis containing one sync card.

21. The method for synchronized video display outputs of claim 17, wherein said generating the internal reference clock source comprises using a reference clock oscillator.

22. The method for synchronized video display outputs of claim 17, wherein the plurality of graphics subsystems are housed in multiple chassis each containing one sync card, each sync card being in communication with each graphics subsystem in the corresponding chassis, wherein one of the multiple sync cards is a master sync card and a remainder of the multiple sync cards being slave sync cards.

23. The method for synchronized video display outputs of claim 22, wherein the plurality of sync cards are connected in at least one of a daisy-chain manner, a direct manner in which each slave sync card is directly connected to the master sync card, and a combination of the daisy-chain manner and direct manner.

24. The method for synchronized video display outputs of claim 22, further comprising multiplexing by selecting the internal reference clock source where the sync card is a master sync card and selecting the external reference clock input where the sync card is a slave sync card.

25. The method for synchronized video display outputs of claim 24, further comprising automatically determining whether the sync card is a master or slave using a phase lock loop (PLL) that receives as input the external reference clock input and a clock output of the PLL connected via a feedback loop.

26. The method for synchronized video display outputs of claim 25, wherein said multiplexing comprises selecting the internal reference clock source if the PLL fails to lock and selecting the external reference clock input if the PLL locks.

27. The method for synchronized video display outputs of claim 18, further comprising:

receiving inputs by a counter;

comparing output of the counter and a value from at least one register by a comparator; and generating an interrupt signal for transmission to the host processor by an interrupt logic of the sync card in response to the output received from the comparator.

28. The method for synchronized video display outputs of claim 27, wherein at least one of the counter and comparator is selected from a field programmable gate array (FPGA) and a complex programmable logic device (CPLD).

29. The method for synchronized video display outputs of claim 27, wherein the register comprises two registers storing two positions corresponding to before and after a point on the display when a buffer swap is performed by the graphics processor if one has been requested.

30. The method for synchronized video display outputs of claim 29, wherein said generating comprises generating the interrupt signal by the interrupt logic when contents of the counter is equal to one of the values stored in the registers.

31. The method for synchronized video display outputs of claim 27, wherein the counter is a scanline counter that counts the number of horizontal syncs (HSYNC) that have passed since the last vertical sync (VSYNC) from the graphics processor and said at least one register comprises two registers storing two scanline positions.

32. The method for synchronized video display outputs of claim 27, wherein the counter is a clock counter that counts clocks since a vertical sync (VSYNC) was asserted by the graphics processor and said at least one register comprises two registers storing two raster positions.

*33. A system for synchronized video display outputs, comprising:*

*a plurality of graphics subsystems for outputting video display outputs, said plurality of graphics subsystems being housed in at least one chassis, each graphics subsystem comprising a graphics processor;*

*a sync card adapted to communicate with a plurality of graphics processors for distribution of reference clock thereto, receiving reference clock input and raster sync signal from a previous sync card, and transmitting reference clock input and raster sync signal to a next sync card.*

* * * * *